United States Patent [19]

Suefuji et al.

[11] Patent Number: 4,802,831
[45] Date of Patent: Feb. 7, 1989

[54] FLUID MACHINE WITH RESIN-COATED SCROLL MEMBERS

[75] Inventors: Kazutaka Suefuji, Shimizu; Aizo Kaneda, Yokohama; Yasuyuki Kanai, Shimizu; Shozo Nakamura, Yokohama; Tetsuya Arata, Shimizu; Katsuaki Kikuchi, Tsuchiura; Takao Senshu, Shizuoka; Kimiaki Nakakado, Shimizu; Eiji Maeda, Shimizu; Sadatsohi Minakawa, Shimizu, all of Japan

[73] Assignee: Hitachi, Ltd., Tokyo, Japan

[21] Appl. No.: 37,849

[22] Filed: Apr. 13, 1987

[30] Foreign Application Priority Data

Apr. 11, 1986 [JP] Japan ................. 61-82045
May 28, 1986 [JP] Japan ................ 61-121131
Jun. 2, 1986 [JP] Japan ................ 61-125787

[51] Int. Cl.$^4$ .................. F04C 18/04; F04C 29/00
[52] U.S. Cl. .................. 418/55; 418/56; 418/152; 418/178
[58] Field of Search .............. 418/55, 56, 83, 152, 418/153, 178; 428/458

[56] References Cited

U.S. PATENT DOCUMENTS

| Re. 24,932 | 1/1961 | Davey | 418/178 |
| 4,456,712 | 6/1984 | Christie et al. | 428/290 |
| 4,490,102 | 12/1984 | Carré et al. | 418/178 |
| 4,547,137 | 10/1985 | Terauchi et al. | 418/55 |
| 4,678,416 | 7/1987 | Hirano et al. | 418/55 |

FOREIGN PATENT DOCUMENTS

| 57-95454 | 6/1982 | Japan | 428/458 |
| 58-91388 | 5/1983 | Japan | . |
| 58-148292 | 9/1983 | Japan | 418/178 |
| 59-203893 | 11/1984 | Japan | 418/83 |
| 59-218382 | 12/1984 | Japan | . |
| 730610 | 5/1980 | U.S.S.R. | 428/458 |

Primary Examiner—John J. Vrablik
Attorney, Agent, or Firm—Antonelli, Terry & Wands

[57] ABSTRACT

A compressor has stationary and orbiting scroll members formed thereon with spiral wraps engaged with each other to define compression chambers which, when the orbiting scroll member is moved relative to the stationary scroll member, are radially inwardly moved while decreasing their volumes. Each scroll member is composed of a metallic base scroll member having a spiral wrap formed on one side and a coating layer of a resin compound formed on the said side of the scroll member, including the surfaces of the wrap. The coating layer is molded by placing the base scroll member in a mold cavity with a space left between the said side of the base scroll member and a mold part and by injecting the resin compound into the space.

19 Claims, 11 Drawing Sheets (0°)(360°)

(90°)

(270°)

(180°)

F I G. 13
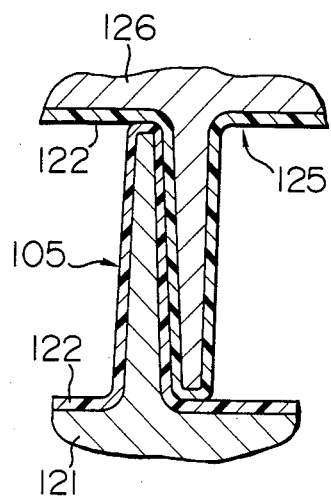
F I G. 15
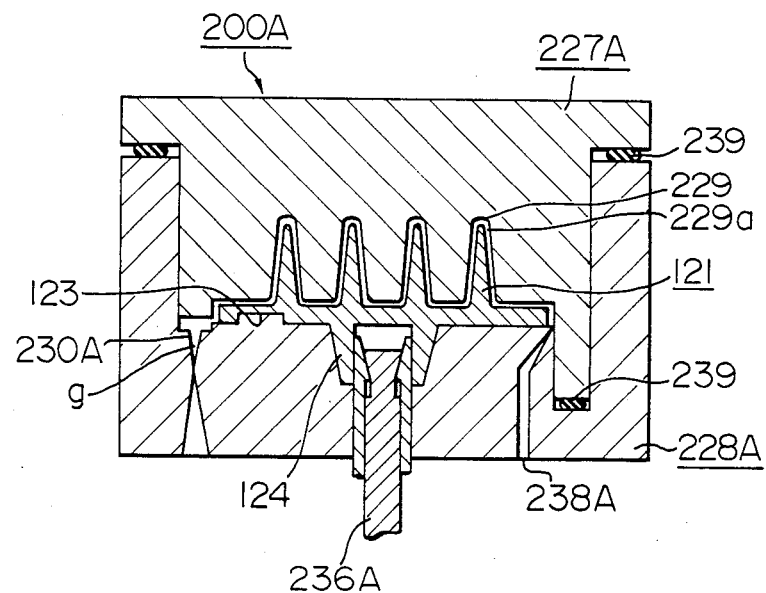

F I G. 16
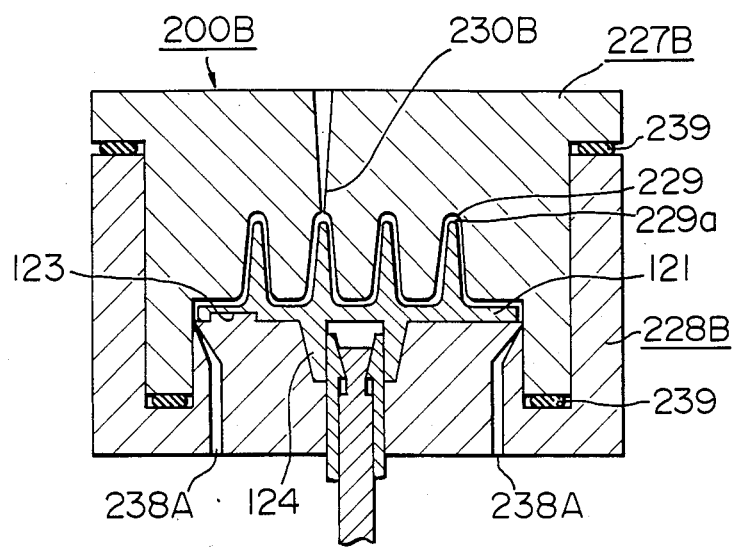
F I G. 17
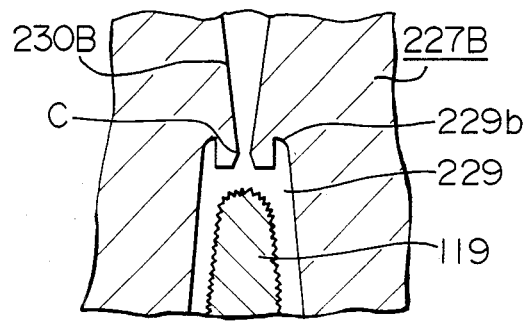

FLUID MACHINE WITH RESIN-COATED SCROLL MEMBERS

BACKGROUND OF THE INVENTION

The present invention relates to a scroll-type fluid machine which is suitable for use as a compressor of a refrigerating or air-conditioning system. More particularly, the invention is concerned with scroll members incorporated in a scroll-type fluid machine of the type mentioned above and improved to ensure a higher productivity and a higher reliability of operation. The present invention is also concerned with a method for manufacturing the improved scroll members.

A scroll-type fluid machine has been known which incorporates a metallic stationary scroll member having an end wall and a spiral wrap formed on one side of the end wall to protrude upright therefrom, and a metallic orbiting scroll member having an end wall and a spiral wrap protruding upright from one side of the end wall and of the same shape as that of the stationary scroll member but wound in the direction opposite to that in the stationary scroll member, the stationary and orbiting scroll members being assembled together such that the wraps of both members mesh with each other so as to define working chambers therebetween. When this fluid machine is used as a compressor, the orbiting scroll member is power-driven so as to make an orbital motion with respect to the stationary scroll member so that the working chambers are gradually moved towards the center of the stationary scroll member while progressively decreasing their volumes.

In this type of fluid machine, it is necessary that the wraps of both scroll members be machined and finished to a high degree of dimensional precision. This in turn requires a large number of steps in the production process, resulting in a long production time and a low productivity.

In order to obviate these problems, Japanese Unexamined Patent Publication Nos. 91388/1983 and 218382/1984 propose a method in which the orbiting scroll member and the stationary scroll member are both coated at their opposing surfaces with precision-molded resin coating layers. These pieces of literatures, however, merely state that a thermosetting resin, for example, can be suitably used as the material of the coating layers, and fail to disclose practical examples of materials and compositions of the resin coating layers which would exhibit high dimensional precision, wear resistance, fatigue strength and adhesive strength to the metallic material from which the scroll base members are made. In addition, no consideration has been made in the proposal as to the resistance of the resin material to the mixture of a machine oil and the working fluid such as freon. These pieces of literatures also lack any suggestion as to the method of forming the resin coating layers with high dimensional precision and surface accuracy of the wraps, although they mention insert molding employing two-color injection molding technique.

Another problem encountered by the conventional scroll wraps is that, since the wraps have a uniform thickness (dimension measured in the radial direction), over the entire length thereof, the volume in the working chamber cannot be reduced to zero and a dead space is formed even in the final stage of compression. In consequence, scroll members of large sizes are required for obtaining a desired capacity of the compressor.

SUMMARY OF THE INVENTION

It is an object of the present invention to provide a scroll type fluid machine improved in respect of the productivity and reliability of operation and to provide a method of making a composite scroll member for use in the fluid machine.

The scroll type fluid machine according to the present invention includes a stationary composite scroll member and an orbiting composite scroll member. Each of the scroll members has a substantially circular end wall and a generally spiral wrap formed on and extending axially from one side of the end wall. The scroll members are disposed such that their wraps are engaged with each other to cooperate together and with the end walls to define working chambers. The orbiting scroll member is driven by a driving means to make an orbiting motion relative to the stationary scroll member so that the working chambers are moved radially to change volumes thereof. Each of the scroll members includes a metallic base scroll member having an end wall portion and a substantially spiral wrap portion extending axially from one side of the end wall portion and a coating layer of a resin compound formed on at least the entire surface of the side of the end wall portion, including surfaces of the wrap portion. The spiral wrap portion of each of the composite scroll members terminates in an inner end portion which is generally bulbous as viewed axially of the scroll member. The resin compound includes a thermosetting resin and an inorganic filler and has a linear thermal expansion coefficient of not greater than $2.8 \times 10^{-5}$ cm/cm/°C. and a glass transition temperature of not lower than 160° C.

The method according to the present invention includes a step of preparing a metallic base member having a substantially circular end wall portion and a generally spiral wrap portion formed on and extending axially from one side of the end wall portion. The base scroll member is then placed in a mold cavity defined by a pair of mold parts when in their closed positions. The mold cavity has first and second cavity surfaces. The first cavity surface is provided by one of the mold parts and designed to be engaged by a back of the base scroll member. The second cavity surface is provided by the other mold part and so shaped and sized as to provide a configuration which is substantially complementary to and slightly greater than the one side of the base scroll member end wall portion so that a space of a predetermined dimension is defined between the other mold part and the base scroll member. The mold has a gate. A predetermined quantity of a resin compound is introduced through the gate into the mold cavity to fill up the space so that a coating layer of the resin compound is formed on the one side of the base scroll member end wall portion and on the wrap portion. The method of the present invention is characterized in that the base scroll member has surface roughness of from 5 to 100 μmRmax all over its entire surfaces excepting the back side of the end wall portion, that the resin compound includes a thermosetting resin and an inorganic filler and has a linear thermal expansion coefficient of not greater than $2.8 \times 10^{-5}$ cm/cm/°C. and a glass transition temperature of not lower than 160° C., and that, after the base scroll member has been placed on the first cavity surface, the mold is provisionally closed leaving a predetermined compression margin, and the resin compound is then introduced into the mold cavity and, thereafter, the mold is completely closed until the compression margin becomes zero.

The above and other objects, features and advantages of the present invention will be made more apparent by the following description with reference to the accompanying drawings.

BRIEF DESCRIPTION OF THE DRAWINGS

FIG. 13 is an enlarged fragmentary sectional view of the orbiting scroll member shown in FIGS. 11 and 12 and a stationary scroll member operatively associated with the orbiting scroll member;

FIG. 15 shows in section a modified mold;

FIG. 16 is similar to FIG. 15 but illustrates a further modified form of the mold; and FIG. 17 is an enlarged fragmentary sectional view of the mold shown in FIG. 16.

DESCRIPTION OF PREFERRED EMBODIMENTS

A first embodiment of the present invention will be described hereinunder with reference to FIGS. 1 to 7.

Figure 1:
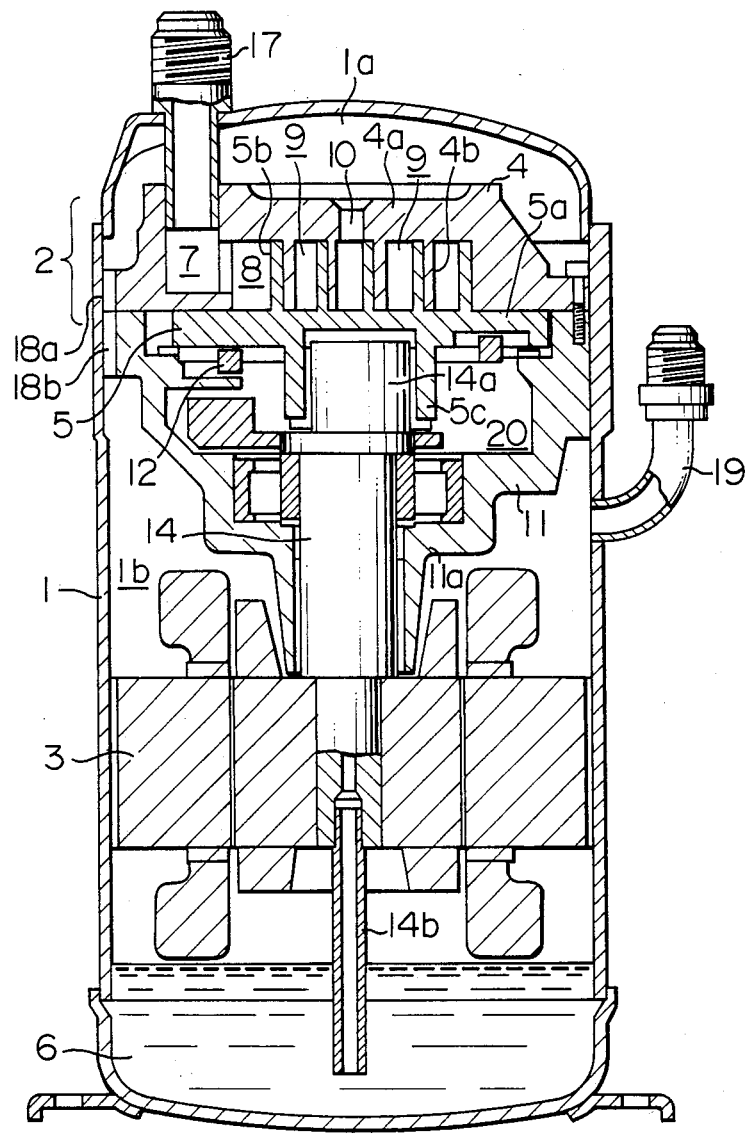
FIG. 1 is a partly axial sectional view of a scroll compressor embodying the present invention.

Referring to FIG. 1, a scroll compressor as an embodiment of the scroll-type fluid machine of the invention has a hermetic casing 1 in which are provided a compressor section 2 and a motor section 3. The compressor section 2 has a stationary scroll member 4 and an orbiting scroll member 5 which is assembled with the stationary scroll member 4 to form hermetic compression chambers 9 therebetween. More specifically, the stationary scroll member 4 has a disk-shaped end wall 4a and a wrap 4b formed on one side of the end wall 4a so as to protrude upright therefrom and having a configuration which follows an involute curve or a similar curve. The end wall 4a is provided with a central discharge port 10 and an outer peripheral suction port 7. The orbiting scroll member 5 has a disk-shaped end wall 5a and a wrap 5b formed on one side of the end wall 5a so as to protrude upright therefrom, the wrap 5b having the same shape as the wrap 4b of the stationary scroll member 4 but wound in the direction opposite thereto. A boss 5c is formed on the side of the end wall 5a opposite to the wrap 5b. A frame 11 has an integral central bearing portion 11a which rotatably supports a rotary shaft 14. The shaft 14 is provided on one end thereof with an eccentric pin 14a which is rotatably received in a bore formed in the boss 5c. The stationary scroll member 4 is fixed at its peripheral portion to the frame 11 by a plurality of bolts. The orbiting scroll member 5 is supported on the frame 11 through an Oldham's mechanism 12 which is composed of an Oldham's ring and an Oldham's key. The Oldham's mechanism 12 prevents the orbiting scroll member 5 from rotating about its own axis, so that the orbiting scroll member makes an orbiting motion with respect to the stationary scroll member 4. The rotary shaft 14 is directly connected at its lower end to a rotor of an electric motor of the motor section 3.

A suction pipe 17 extends through the wall of the hermetic casing 1 and has an inner end connected to the suction port 7 formed in the stationary scroll member 4. The central discharge port 10 in the end wall of the stationary scroll member 4 opens to a discharge chamber 1a which is formed in the hermetic casing 1 and communicated through passages 18a and 18b with a lower chamber 1b above the motor section 3. The lower chamber 1b is communicated with a discharge pipe 19 which extends through the wall of the hermetic casing 1.

A space 20, which will be referred to as "back-pressure chamber" hereinafter, is defined between the frame 11 and the back surface of the orbiting scroll member 5. A portion of the gas of a pressure level intermediate between the suction pressure and the discharge pressure is introduced into the back-pressure chamber 20 so as to produce a force which acts on the back surface of the orbiting scroll member 5 to urge the orbiting scroll member 5 in the axial direction towards the stationary scroll member 4, thus resisting a thrust force which is produced by the gas pressures in the compression chambers 9 between both scroll members 4 and 5 and acts on the orbiting scroll member 5 downwardly. The introduction of the gas of the intermediate pressure into the back-pressure chamber 20 is made though small holes (not shown) formed in suitable portions of the end wall 5a of the orbiting scroll member 5.

An oil suck-up pipe 14b is formed to project downwardly from the lower end of the rotary shaft 14. The bore in this oil suck-up pipe is communicated with an oil passage (not shown) formed in the rotary shaft 14 and extending along the length of the latter up to the upper end surface of the eccentric pin 14a. The oil suck-up pipe 14b is immersed in lubricating oil 6 collected in a bottom section of the hermetic casing 1. During the operation of the compressor, the lubricating oil 6 is sucked up through the oil suck-up pipe 14b and is supplied through the oil passage in the rotary shaft 14 to various sliding parts thereby lubricating these parts.

In operation, the torque of the electric motor of the motor section 3 is transmitted to the rotary shaft 14 directly connected to the shaft of the motor. In consequence, the eccentric pin 14a rotates about the axis of the rotary shaft 14. In consequence, the boss 5c and, hence, the orbiting scroll member 5 orbits, about the axis of the rotary shaft 14a. The Oldham's mechanism prevents the orbiting scroll member 5 from rotating about its own axis to cause the orbiting scroll member 5 to make an orbiting motion with respect to the stationary scroll member 4. As a result of this orbiting motion, the compression chambers 9 are gradually moved towards the center of the stationary scroll member 4 while progressively decreasing their volumes. A refrigerant gas at a low pressure and a temperature is sucked into suction chambers open in the outer periphery of the stationary scroll member through a suction pipe 17 and the suction port 7. The gas is then confined in the compression chambers and progressively compressed to increase its pressure and temperature. The thus compressed gas is discharged through the discharge port 10 into the discharge chamber 1a and introduced into the lower chamber 1b through the passages 18a and 18b. The gas is then delivered to the outside of the compressor through the discharge pipe 19. The construction and operation of the compressor described heretofore are substantially the same as those of known scroll compressors.

Figure 2:
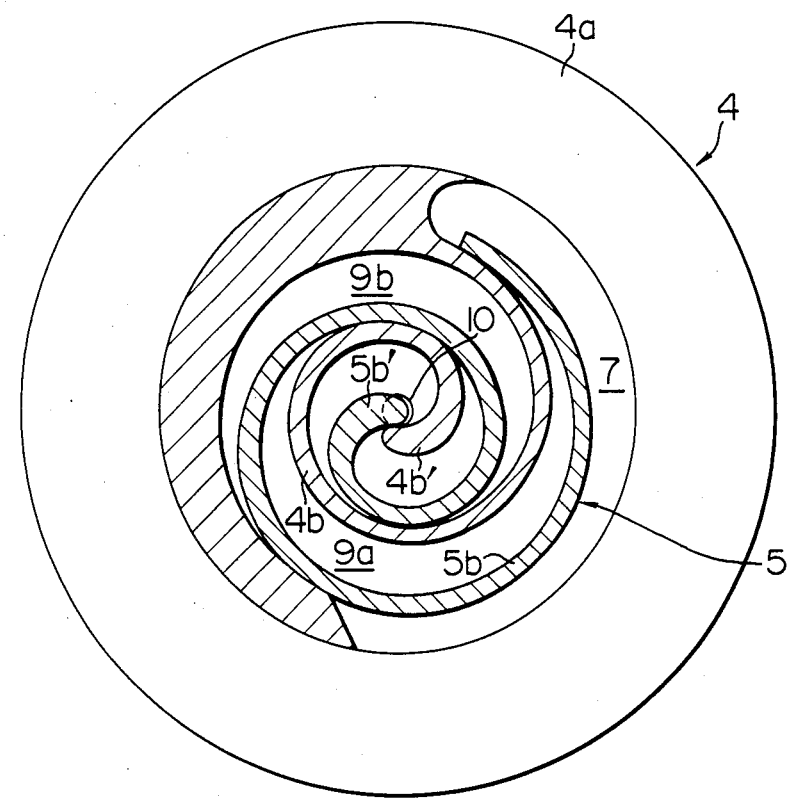
FIG. 2 is an enlarged cross-sectional view of a compressing section of the compressor shown in FIG. 1.
Figure 3:
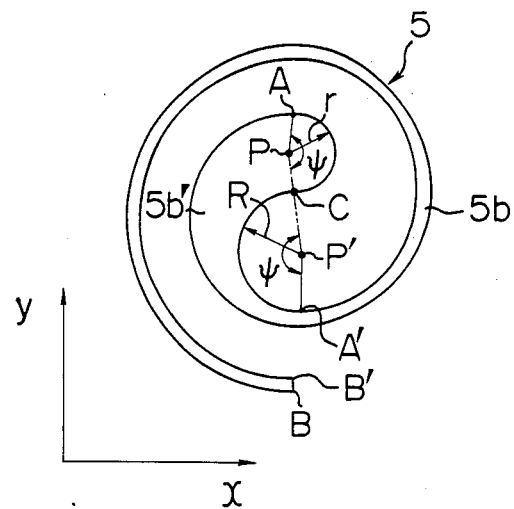
FIG. 3 is an enlarged fragmentary schematic illustration of a spiral wrap of an orbiting scroll member of the compressor shown in FIG. 2.

However, the scroll compressor embodying the present invention has a specific form of the wraps of the scroll members as will be understood from the following description made in conjunction with FIGS. 2 and 3. FIG. 2 shows the stationary scroll member 4 and the orbiting scroll member 5 associated therewith. As will be explained later, the wraps 4b and 5b are made of a composite material composed of a scroll base member and a resin coating layer precision-molded on the surface of the scroll base member. The outer configurations of these composite wraps are shown in FIG. 2. It will be seen from this Figure that radially inner ends 4b' and 5b' of these wraps 4b and 5b are expanded into generally bulbous forms. The shape of the bulbous ends 4b' and 5b' of the wraps 4b and 5b will be explained hereinunder with reference to FIG. 3.

As will be understood from FIG. 3, each wrap 5b has a form defined by outer and inner involute curves AB and A'B'. The wrapping start point A of wrapping of the outer involute curve AB and the wrapping start point A' of the inner involute curve A'B' are 180° offset from each other. The wrapping end pints B and B' are located at positions which are angularly spaced from the respective start points A and A' sufficiently to assure that sealingly closed spaces or compression chambers are confined.

Representing the radius of the orbiting motion by $\epsilon$ and the thickness of the wrap by "t", the radius a of the base circle of the involute curve is given by:

$$a = (\epsilon + t)/\pi$$

Representing the wrap angle by $\lambda$ and the phase angle of the outer involute curve being 0 (zero), the outer involute curve is determined by the following formulae:

$$\begin{cases} x = a (\cos \lambda + \lambda \sin \lambda) \\ y = a (\sin \lambda - \lambda \cos \lambda) \end{cases}$$

The inner involute curve A'B' is given by the following formulae;

$$\begin{cases} x = a \{\cos \lambda + (\lambda - \beta)\sin \lambda\} \\ y = a \{\sin \lambda - (\lambda - \beta)\cos \lambda\} \end{cases}$$

where $\beta$ is a value given by $\beta = t/a$.

Assuming that the position of the point A is represented by $\lambda_1$ in terms of the wrap angle, the position of the point A' is represented by $(\lambda_1 + \pi)$ in terms of the wrap angle. Similarly, the positions of the point B and the point B' are given by $(\lambda_1 + 2\pi)$ and $(\lambda_1 + 3\pi)$, respectively. The point A is smoothly connected to a convexed arc of a radius r on the inner side thereof, while the point A' is smoothly connected to a concaved arc of a radius R on the inner side thereof. The convexed and concaved arcs are connected smoothly to each other at a mid point which is indicated at C. It is necessary that R and r meet the following condition:

$$R = r + \epsilon$$

It is also necessary that the radius r is represented by the following formula:

$$r = \frac{4a^2(\lambda_1^2 + 1) - \epsilon^2}{4(\epsilon + 2a\lambda_1)}$$

Representing the ratio r/a by $\gamma$, the coordinates (xp, yp) of the point P are given by the following formulae:

$$Xp = a\{\cos \lambda_1 + (\lambda_1 - \gamma) \sin \lambda_1\}$$

$$Yp = a\{\sin \lambda_1 + (\lambda_1 - \gamma) \cos \lambda_1\}$$

The point P' is located at a position which is in symmetry with the point P with respect to the center, so that the coordinates (Xp', Yp') of the point P' are given as follows:

$$Xp' = -a\{\cos \lambda_1 + (\lambda_1 - \gamma) \sin \lambda_1\}$$

$$Yp' = -a\{\sin \lambda_1 - (\lambda_1 - \gamma) \cos \lambda_1\}$$

The convexed and concaved arcs extend over the same angle $\psi$ which is given by the following formula:

$$\psi = \pi - \tan^{-1} \frac{1}{\lambda_1 - \gamma}$$

A description will be made hereinunder as to the construction of the wrap as well as a method of producing the same.

Figure 4:
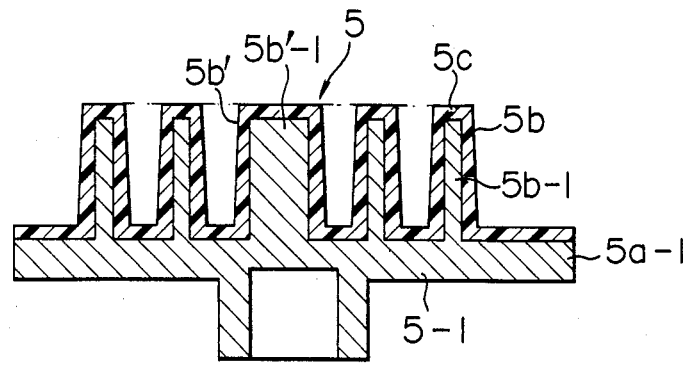
FIG. 4 is a schematic sectional illustration of the orbiting scroll member with a coated layer shown exaggeratively.

FIG. 4 is a sectional view of the orbiting scroll member 5 incorporated in the embodiment under description. As will be seen from this Figure, a base member 5-1 of the orbiting scroll member 5 is beforehand fabricated by, for example, casting from a metal which has a large strength and rigidity, such as cast iron or steel. Then, a resin coating layer 5c is precision-molded on the surfaces of the wrap portions 5b-1, 5b'-1 and the surface of the end wall 5a-1 on which the wrap is formed. The thickness of the resin coating layer 5c is shown in a somewhat exaggerated manner.

Figure 5:
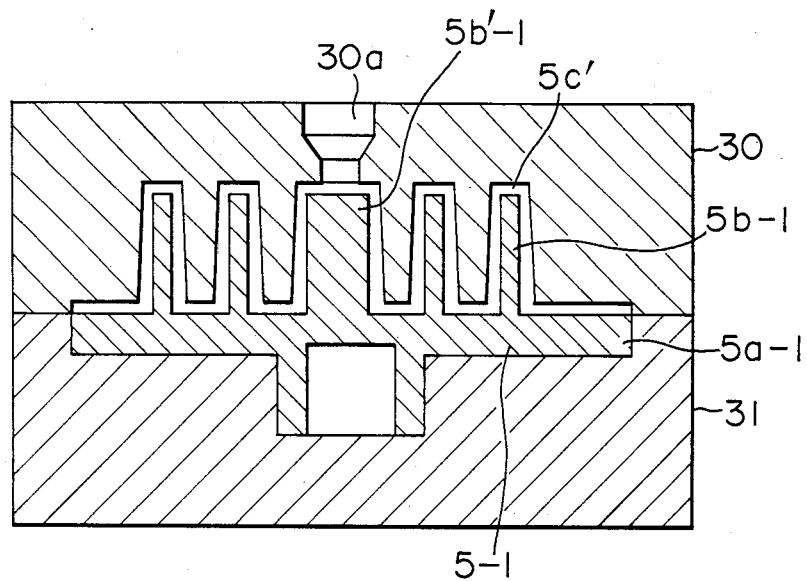
FIG. 5 is a sectional view of a mold use for molding a resin compound on the orbiting scroll member to form the coating layer shown in FIG. 4.

FIG. 5 shows the method for forming the resin coating layer 5c. The base member 5-1 of the orbiting scroll member 5 is placed in a mold which is constituted by mold parts 30 and 31. The mold part 30 has a spiral groove which is so precisely shaped and sized as to provide a minute gap between the surface of the wrap and the surface of the groove. The mold part 30 also has a resin pouring gate 30a having a diameter smaller than the thickness of the wrap portion 5b' and positioned so as to oppose the end of the central portion of the wrap where the bulbous portion 5b'-1 is to be formed. The base member 5-1 of the orbiting scroll member is seated at its side opposite to the wrap 5b in a recess formed in the mold part 31. When the mold part 30 is assembled together with the mold part 31 in which the base member 5-1 is seated, a mold cavity 5c' of a predetermined shape and size is formed between the mold part 30 and the surfaces of the end wall portion 5a-1 and the wrap portions 5b-1, 5b'-1 of the base member 5-1.

A resin compound which will be explained later is introduced through the resin pouring gate 30a to fill up the mold cavity 5c' and is then set on the base member 5-1 so that the orbiting scroll member 5 composed of the base member 5-1 and the resin coating layer 5b formed on the entire surface of the base member 5-1 except the back side thereof is obtained as shown in FIG. 4. The shape of the resin pouring gate 30a is so determined that, when the mold part 30 is separated, the resin portion filling the resin pouring gate 30a is so severed as to leave a slight dent or recess in the end surface of the wrap portion 5b'. This recess does not affect the gas sealing performance because it has a diameter smaller than the thickness of the wrap portion 5b'. In addition, no projection is left on the end necessary to effect any machining on the surfaces of the wrap portions 5b and 5b' and the surface of the end wall 5a having the wrap formed thereon. The sole resin pouring gate 30a provided at the center of the mold part 30 well distributes the resin to the entire portions of the mold cavity 5c' and avoids any problem which might be caused when two or more resin pouring gates are used, e.g., inferior precision and insufficient strength due to formation of weld lines in the portions where the resin portions from different gates merge with each other.

The orbiting scroll member 5 embodying the present invention is thus formed by the metallic base member 5-1 and the resin coating layer 5c molded thereon. It will be clear to those skilled in the art that a similar production method can be applied also to the production of the stationary scroll member 4 of the scroll compressor.

The resin compound used in the described embodiment may be a mixture of 60 wt % of bismaleimide-triazine resin, 20 wt % of fused silica as an inorganic filler and 20 wt % of a mixture of graphite power and molybdenum disulfide (MoS$_2$) as a solid lubricant. This resin compound is then precision-molded on the surface of the scroll base member 5-1 so as to form the resin coating layer 5c by vacuum injection compression molding. The vacuum injection compression molding method will be described in detail later.

The bismaleimide-triazine resin exhibits a superior heat resistance even at high temperature as well as distinguished resistance to oil and freon. The fused silica serves to lower the linear thermal expansion coefficient of the resin compound to a level approximating that of the scroll base member 5-1 and to improve the mechanical strength. The mixture of graphite power and molybdenum disulfide improves the wear resistance. The resin compound composed of these elements exhibits a linear thermal expansion coefficient of about $2.5 \times 10^{-5}$ cm/cm/°C. and a glass transition temperature of about 230° C. The adhesive strength between this resin compound and the scroll base member 5-1 is higher than 130 kg/cm$^2$ at the room temperature. This resin compound also exhibits a small molding shrinkage factor.

To sum up, this resin compound offers the following advantages in the temperature region between $-20°$ C. and 150° C. in which the scroll compressor is used: (1) almost no agelong change in the size of the wrap, (2) high bonding strength between the scroll base member 5-1 and the resin coating layer, (3) high wear resistance, (4) excellent anti-oil and anti-freon properties and (5) high mechanical strength. Thus, the resin compound referred to above exhibits a high reliability when used as the material of the resin coating layer on the scroll base member of a scroll member in accordance with the present invention.

FIGS. 6A to 6D schematically illustrate the principle of the compression operation of a compressor incorporating a stationary scroll member 4 and an orbiting scroll member 5 produced by the method described above.

Figure 6A:
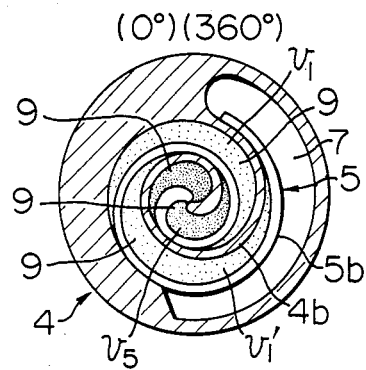
FIGS. 6A through 6D illustrate the principle of the compression operation of the scroll compressor with the orbiting scroll member shown at different stages of compression operation.
Figure 6B:
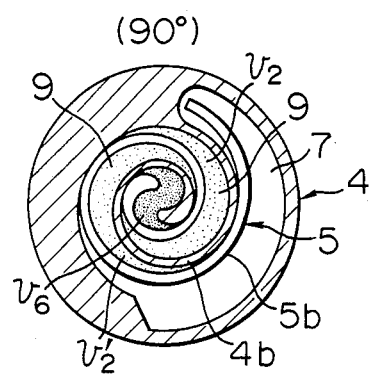
Figure 6D:
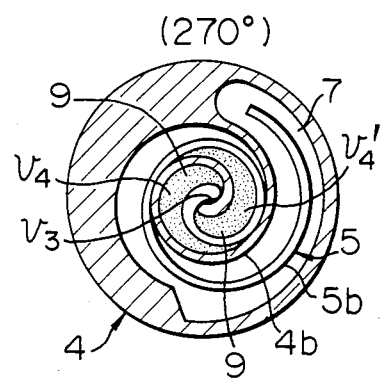
Figure 6C:
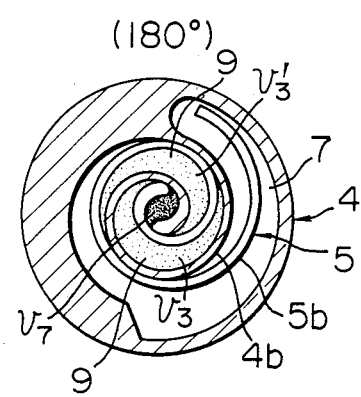

These Figures show in section a portion of the stationary scroll member 4 including the suction chamber 7 and a portion (not sectioned) of the wrap 5b of the orbiting scroll member 5 meshing with the stationary scroll member 4. The compression chambers are formed as closed spaces defined between the end walls of both scroll members. In these Figures, the orbiting scroll member 5 is shown at four different positions 90° offset one from another. More specifically, in the stage shown in FIG. 6A, two compression chambers 9 have just been isolated from the suction chamber 7 and have been closed to form the maximum volume $V_1 + V'_1$. In the stage shown in FIG. 6B, the total volume of the compression chambers 9 has been decreased to $V_1 + V'_2$. In the stage shown in FIG. 6C, the total volume has been further decreased to $V_3 V'_3$. Considering that the wraps of both scroll members have an identical form, it will be clear that the volumes $V_1$ and $V'_1$ are equal to each other. Similarly, the volumes $V_2$ and $V_3$ are equal to the volumes $V'_2$ and $V'_3$, respectively. A further orbiting motion of the orbiting scroll member 5 to the position shown in FIG. 6A causes both compression chambers to merge into a single chamber having a volume $V_5$ which is further decreased from the total of $V_4$ and $V'_4$. The volume of this single chamber further decreases to $V_6$ (FIG. 6B) and then to $V_7$ (FIG. 6C). Finally, the volume of the single compression chamber is reduced to zero in the stage shown in FIG. 6D.

Figure 7:
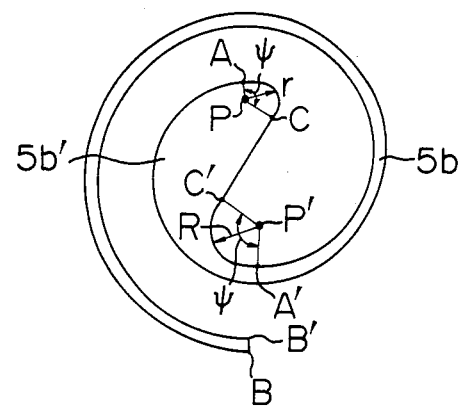
FIG. 7 is similar to FIG. 3 but illustrates a modification of the wrap on the orbiting scroll member.

FIG. 7 shows a modification of the configuration of the inner end of the wrap. This modification is different from the form shown in FIG. 3 in that the convexed arc AC and the concaved arc A'C' are connected to each other through a common tangential line CC', rather than being connected directly. Thus, the formulae determining the configuration of the inner end of the wrap, coordinates and dimensions are different from those of the form shown in FIG. 3 in the following respects:

$$0 \leq r < \frac{4a^2(\lambda_1^2 + 1) - \epsilon^2}{4(\epsilon + 2a\lambda_1)}$$

-continued
$$\psi = \frac{\pi}{2} + \tan^{-1}\frac{R+r}{l} - \tan^{-1}\frac{1}{\lambda_1 - \gamma}$$

where, l represents the length of the tangential line CC' which is given by the following formula:

$$l = \sqrt{4a^2\{(\lambda_1 - \gamma)^2 + 1\} - (R + r)^2}$$

The principle and process of the compression operation with wraps of this modification are the same as those explained before and the volume of the compression chamber is finally reduced to zero also in this case.

Figure 8:
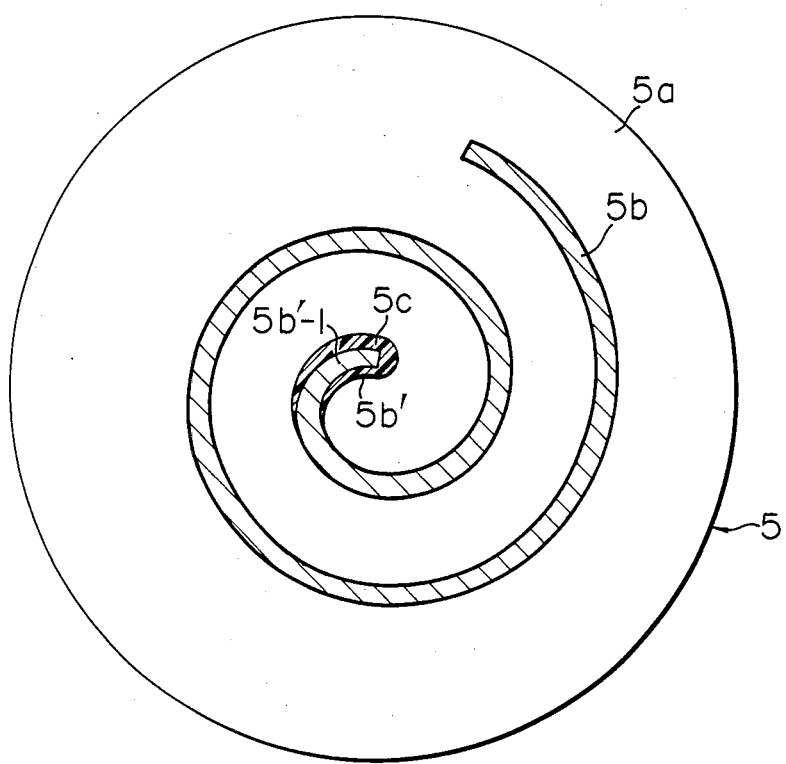
FIG. 8 is a cross-sectional view of a second embodiment of the orbiting scroll member of the scroll compressor.
Figure 9:
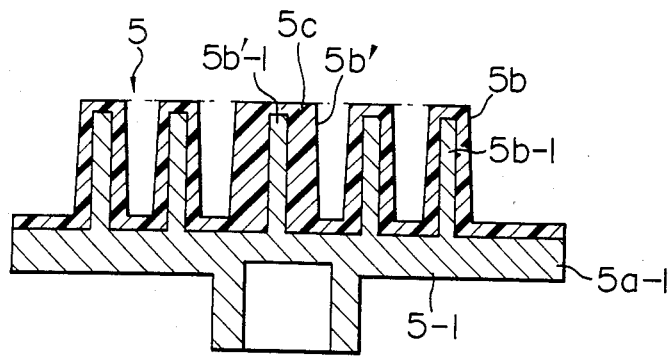
FIG. 9 is similar to FIG. 3 but illustrates the scroll member shown in FIG. 8.
Figure 10:
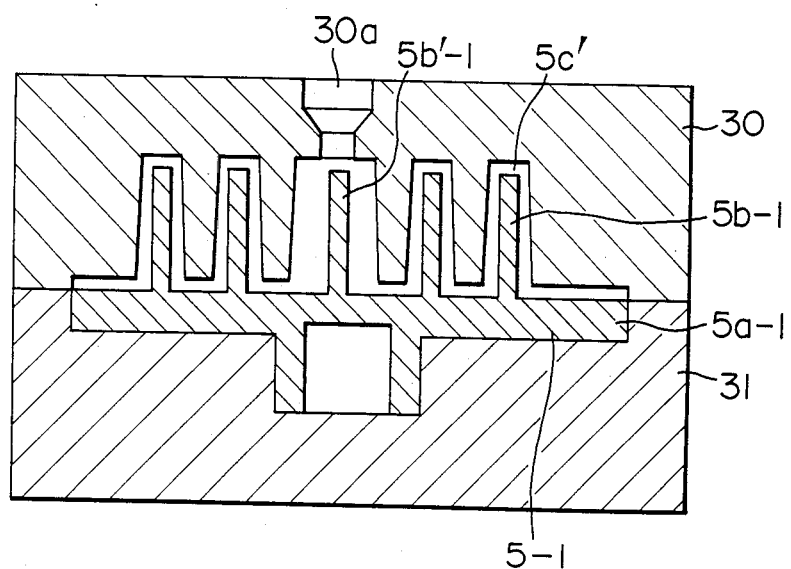
FIG. 10 is similar to FIG. 5 but illustrates a mold used to mold a resin composition on the scroll member shown in FIG. 9.

FIGS. 8 to 10 show a second embodiment of the scroll member of a fluid machine in accordance with the present invention.

FIG. 8 shows a wrap of the orbiting scroll member 5 in a section taken along a plane perpendicular to the axis of the scroll member 5. The outer configuration of this wrap is substantially the same as that of the first embodiment but the form of the base member is different. Namely, in this embodiment, the wrap portion of this base member has a uniform or constant thickness over its length from the wrap portion 5b to the wrap portion 5b' and the bulbous form of the inner end of the wrap is completed by the resin layer 5c. FIG. 9 shows the orbiting scroll member 5 of this embodiment in section taken along a plane parallel to the axis of the scroll member, with the thickness of the resin coating layer shown in a somewhat exaggerated manner. FIG. 10 shows in section a mold which is suitable for use in producing the orbiting scroll member of the second embodiment. Since the molding method is substantially the same as that of the first embodiment, detailed description thereof is omitted. In addition to the advantages offered by the first embodiment, the second embodiment offers an advantage that wrap member having a constant thickness can be formed by suitably winding a material having a constant thickness, e.g., a steel sheet.

In the first and the second embodiments of the invention described hereinbefore, the surfaces of the base members of the scroll wrap are coated with elastic resin coating layers. The presence of the resin coating layers advantageously eliminates various problems which may otherwise be caused by a direct metal-to-metal contact between both scroll members. This in turn allows the wraps of both scroll members to engage with each other with a higher level of gas-tightness, thus reducing escape of a gas which is being compressed in the compression chambers, thereby contributing to an improvement in the performance of the scroll compressor.

It will be also understood that the central end portions of the wraps on both scroll members are shaped to provide bulbous forms so as to eliminate dead spaces which were inevitably formed in the conventional scroll compressors in their final stages of compression. In consequence, the inventive scroll compressor can operate with higher compression ratio. This means that the size of the scroll compressor can be reduced for a given capacity to be obtained. In addition, the surfaces of the wraps are coated with resin coating layers which are formed by precision molding. The mold part used for molding this coating layer has a resin pouring gate having a diameter smaller than that of the thickness of the bulbous end portion of each scroll wrap. In consequence, the scroll members can be put into use without requiring any mechanical processing after the formation of the resin coating layers, so that the production cost of the scroll members can be reduced remarkably. In addition, the scroll compressor can operate with a minimized gap between the wraps of the scroll member, so that the escape of a gas which is being compressed is reduced thereby exhibiting a higher compression performance.

Figure 11:
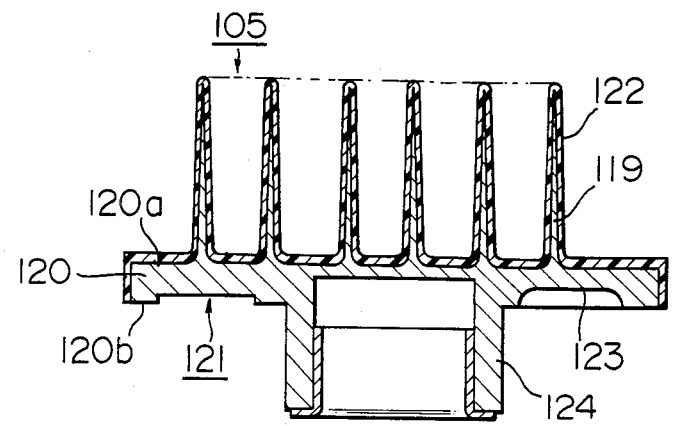
FIG. 11 is similar to FIGS. 3 and 9 but illustrates a third embodiment of the orbiting scroll member of the compressor.
Figure 12:
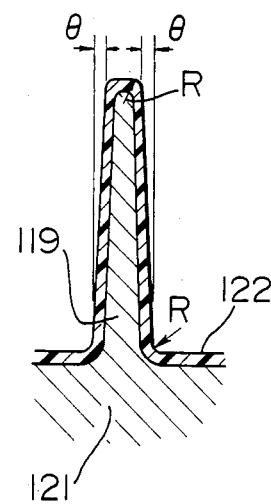
FIG. 12 is an enlarged fragmentary sectional view of the scroll member shown in FIG. 11.

FIGS. 11 to 13 show a third embodiment of the orbiting scroll member. This embodiment of the orbiting scroll member, which is denoted by a numeral 105, has a base member 121. The base member 121 is a member as cast from pig iron and has an end wall 120 and a spiral wrap 119 formed on the wrap-carrying surface 120a of the end wall 120. The base member 121 is coated with a resin coating layer 122 of a uniform thickness and made of a resin compound which is, as will be detailed later, composed mainly of a bismaleimide triazine resin, the coating layer extending over the entire surface thereof except the back surface 120b opposite to the wrap carrying surface 120a. A reference numeral 123 designates an Oldham's keyway constituting a part of an Oldham's joint and formed in the back surface 120b of the orbiting scroll member 105. A crankshaft bearing for rotatably receiving a crankshaft (not shown) is denoted by a numeral 124.

The base member 121 of the scroll member 105 will be described in more detail hereinunder. The base member 121 is a cast member cast from pig iron. The surface roughness of the base member 121 depends on the grain-size control of the mold sand and that of the sand used in sand blasting treatment but is usually about 50 $\mu$mRmax in the as-cast state. This surface roughness improves the adhesive strength between the base member 121 and the resin coating layer 122. The back surface 120b of the base member 121 is machined and is not coated with the resin coating layer. In the state after the coating of the wrap 119 with the resin coating layer 122, the wrap is tapered at an angle $\theta$ of 2° in the heightwise direction of the wrap. The top and base ends of the wrap 119 are rounded at a radius R of about 1 mm. The provision of the taper ensures a smooth removal of the wraps from mold parts, while round corners and edges avoid concentration of stresses which may otherwise be caused in the edges and corners of the resin coating layer 122 by the force produced by the pressure of the gas which is being compressed in the compression chambers. The resin compound of the coating layer 122 is the same as that used in the first embodiment.

This orbiting scroll member 105 is adapted to be used in combination with a stationary scroll member 125 which is also composed of a pig-iron as-cast base member 126 and a resin coating layer 122 which is formed on the entire surface of the base member 126 other than the back thereof, the composition of the resin compound being the same as that used for the orbiting scroll member 105. The surface roughness of the base member 126 and the shape and size of the wrap on the base member 126 are the same as those of the base member 121 of the orbiting scroll member 105. The orbiting scroll member 105 and the stationary scroll member 126 thus fabricated were assembled together as shown in FIG. 13 and the assembly was incorporated in a scroll compressor. A predetermined acceleration test was conducted on the scroll compressor. It was confirmed that the scroll compressor operated without any substantial biting of the scroll wraps and any substantial agelong change in the compression ratio.

EXAMPLE I

An orbiting scroll member 105 was formed by preparing a scroll base member 121 which was an as-cast member cast from pig iron and had a surface roughness of 50 μmRmax, and then coating the surface of the base member 121 with a resin coating layer 122 of a composition formed by 20 wt % of molten silica, 20 wt % of the mixture of molybdenum disulfide and graphite powder and 60 wt % of a bismaleimide triazine resin. The thickness of the resin coating layer 122 was 0.5 mm and the dimensional precision of the scroll wrap covered by this resin composition was ±3 μm.

A stationary scroll member 125 was also prepared by coating a base member with a similar resin coating layer 122. The taper angle θ of the coated wraps was 2° both in the orbiting and stationary scroll members. The radius R, wrap height and the scroll outside diameter were 1 mm, 30 mm and 130 mm, respectively, both in the orbiting scroll member 105 and the stationary scroll member 125. These scroll members 105 and 125 were assembled together in a scroll compressor and an acceleration test was carried out with this compressor under compression ratio (suction/delivery ratio) of 1:6 (5 kg/cm$^2$G/30 kg/cm$^2$G) for 1000 hours at 3,600 r.p.m. No substantial reduction in the compression ratio was observed through the test, thus proving high reliability which is substantially equivalent to that exhibited by the precision-machined scroll members. After the test, the scroll compressor was disassembled and the resin coating layers 122 on both scroll members 105 and 125 were examined. The resin coating layers 122 showed neither damage nor denaturing at all.

Thus, in this embodiment, because the surface of each of the pig-iron as-cast scroll members 121 and 126 is coated with resin coating layer 122 of a composition formed by 60 wt % of bismaleimide-triazine resin, 20 wt % of fused silica and 20 wt % of graphite powder and molybdenum disulfide, the resin-coated wraps can be formed with a high dimensional precision on the order of μm. The resin coating layers exhibit superior anti-oil and anti-freon properties as well as good affinity and adhesion to the base members of the scroll members. It is thus possible to obtain orbiting and stationary scroll members 105 and 125 having superior wear resistance and reliability. Furthermore, the time and the number of steps required for the production of these scroll members is remarkably shortened as compared with the conventional scroll members which were precisely machined to a high degree of accuracy, with resultant increase in the production efficiency and the installation investment efficiency.

Although the base members of the scroll members are as-cast members cast from pig iron, this is not exclusive and the base members may be made from various other materials and by various other forming methods. For example, the base members may be made by die casting from aluminum, or may be formed by forging, plastic work, rough machining and other method.

The base member used in the described embodiment has a surface roughness of about 50 μmRmax. However, the inventors have confirmed that a satisfactorily high bonding strength between the base member and the resin coating layer 122 can be obtained when the surface roughness ranges between 5 and 100 μmRmax.

The taper angle θ of 2° and the radius R of 1 mm also are only illustrative. A sufficient mold parting characteristic is obtained when the taper angle θ is not smaller than 0.5° and the radius R ranging between 0.5 and 2 mm is effective to prevent stress concentration, without impairing moldability.

The inorganic filler, which is fused silica in the described embodiment, may be substituted by other material such as orastenite (mixture of aluminum oxide, silicon oxide or the like), mica, mica powder and so forth. As the solid lubricant, a mono-component lubricant consisting of graphite powder, milling carbon fiber and so forth can be used satisfactorily in place of the mixture used in the described embodiments. The resin compound need not always contain solid lubricant, although the addition of the solid lubricant is preferred because the wear resistance is improved and the life of the resin coating layer 122 is prolonged by the addition of such a solid lubricant.

Fourth Embodiment of the Scroll Member

This embodiment of the scroll members, including both the stationary scroll member and the orbiting scroll member, has a base member similar to that in the third embodiment. The surface of the scroll member except the back thereof is uniformly coated with a resin coating layer of a resin compound which is mainly composed of polyamino bismaleimide resin. More specifically, the resin compound contains 60 wt % of polyamino bismaleimide resin, 20 wt % of fused silica as an inorganic filler, and 20 wt % of solid lubricant composed of a mixture of graphite powder and molybdenum disulfide (MoS$_2$). The resin compound is precision-molded on the base member so as to form the resin coating layer.

The polyamino bismaleimide resin exhibits superior anti-oil and anti-freon properties as well as high resistance to heat. The resin compound mentioned above exhibits a linear thermal expansion coefficient of about $2.3 \times 10^{-5}$ cm/cm/°C. and a glass transition temperature Tg of about 255° C. The strength of bonding between this resin compound and the base member of the scroll member is 110 kg/cm$^2$ at the room temperature. Furthermore, this resin compound shows a sufficiently small molding shrinkage factor. Thus, the resin coating layer exhibits a high reliability in the temperature range of normal use of a scroll compressor, as in the first embodiment described before.

Fifth Embodiment of Scroll Member

This embodiment of the scroll member, including both the stationary scroll member and the orbiting scroll member, has a base member similar to that in the third embodiment. The surface of the scroll member except the back thereof is uniformly coated with a resin coating layer of a resin compound which contains 30 wt % of bismaleimide-triazine resin, 30 wt % of an epoxy resin, 20 wt % of fused silica as an inorganic filler, and 20 wt % of solid lubricant composed of a mixture of graphite powder and molybdenum disulfide (MoS$_2$). The resin compound is precision-molded on the base member by vacuum injection compression molding method so as to form the resin coating layer of a uniform thickness.

The resin compound mentioned above exhibits a linear thermal expansion coefficient of about $2.8 \times 10^{-5}$ cm/cm/°C. and a glass transition temperature Tg of about 190°. The strength of adhesion between this resin compound and the base member of the scroll member is 150 kg/cm$^2$ at the room temperature. Furthermore, this resin compound shows a sufficiently small molding shrinkage factor. Thus, the resin coating layer exhibits a high reliability in the temperature range of normal use of a scroll compressor, as in the first embodiment described before.

In this embodiment, the adhesive strength between the base member and the resin coating layer is increased further to that in the third and fourth embodiments by virtue of the addition of the epoxy resin to the resin compound. A substantially same effect is obtainable by using, in place of the bismaleimide-triazine resin, the same amount of polyamino bismaleimide resin.

Figure 14:
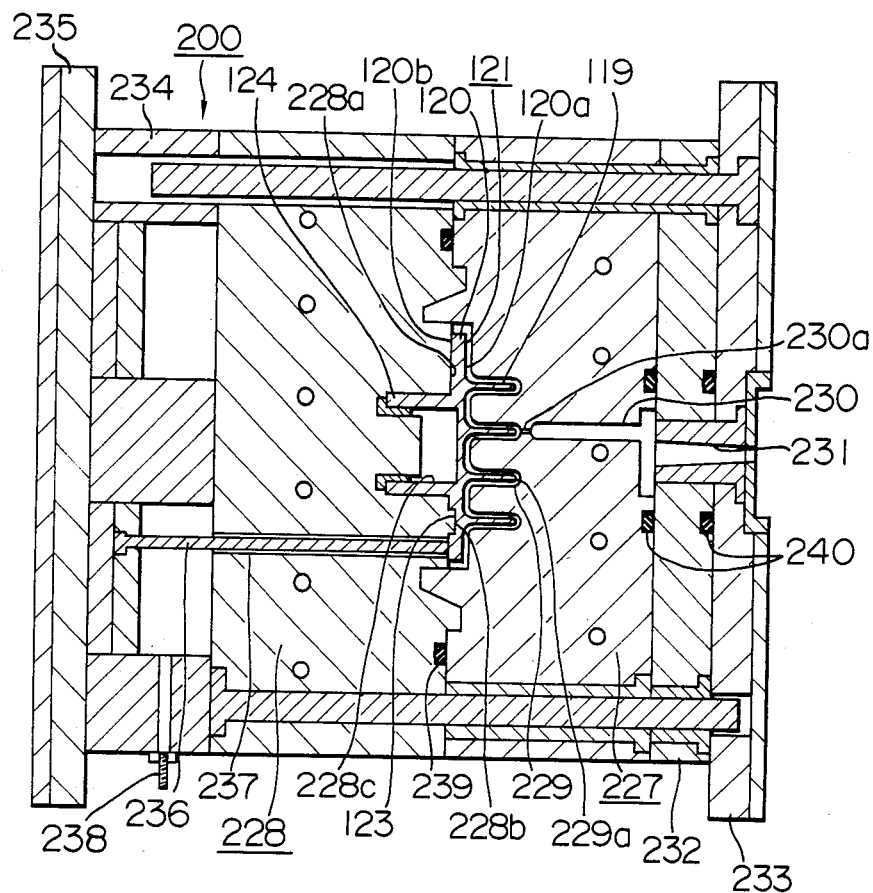
FIG. 14 is a sectional view of a molding machine including a mold used to mold a resin composition on the orbiting scroll member shown in FIGS. 11 to 13.

FIG. 14 is a schematic sectional view of a molding machine 200 which is used in the production of the orbiting scroll member 105 shown in FIG. 11. The molding machine is shown in the closed state with the base member 121 of the orbiting scroll member 105 seated in the mold cavity. In this Figure, the same reference numerals are used to denote the same parts or members as those used in FIG. 11. The molding machine 200 has a mold which is composed of a first stationary mold part 227 and a second movable mold part 228 which cooperates with the first mold part 227 to define a mold cavity 229 of a configuration which is substantially the same as that of the orbiting scroll member 105 to be formed. The stationary mold part 227 is fixed to a stationary base 233 through an intermediate plate 232, while the movable mold part 228 is secured to a movable base 235 through a spacer block 234. A sealing "O" ring 239 is placed in an annular groove formed in the cavity surface 228a of the movable mold part 228. Similar "O" rings 240 are placed between the stationary mold part 227 and the intermediate plate 232 and between the intermediate plate 232 and the stationary base 233, respectively, for the purpose of preventing any leak of the gas.

The stationary mold part 227 has a resin pouring port 230 leading to a gate 230a which is arranged to enable the resin composition to be introduced into the portion of the mold cavity 229 adjacent to the end of the wrap portion of the base member. The movable mold part 228 is provided on the cavity surface 228a thereof with a projection 228b which is complementary to the Oldham's key-way 123 which is formed in the base member 121 of the orbiting scroll member. The cavity surface 228a of the movable mold part 228 is also provided in a central portion thereof with a bearing-receiving portion 228c which is complementary to the configuration of the crankshaft bearing portion 124 which is formed on the orbiting scroll member. An ejector rod 236 movably extends through a bore formed in the movable mold part 228 leaving an annular gap 237 therearound. A vacuum suction port 238 is formed in the spacer block 234 and connected to a vacuum pump (not shown). After the closing of the mold, the cavity 229 is evacuated by a vacuum pump through the vacuum suction port 238 and the annular gap 237 mentioned above, as will be explained later.

Using the molding machine 200 having the described construction, the orbiting scroll member of a scroll-type fluid machine in accordance with the invention is produced by a method which will be explained hereinunder.

As stated before, the base member 121 of the scroll member is cast from pig iron. The surface of the base member 121 is left in as-cast state except for a back surface 120b which has been machined. The as-cast surface of the base member 121 has a surface roughness which is on the order of about 50 $\mu$mRmax. The resin as the coating material has a composition which is formed by 20 wt % of fused silica as an inorganic filler, 20 wt % of a mixture of graphite powder and molybdenum disulfide as a solid lubricant, and 60 wt % of bismaleimide-triazine resin.

After the mold is opened, the base member 121 is placed in the mold such that its back surface 120b rests on the cavity surface 228a of the movable mold part 228 with the crankshaft bearing portion 124 and the Oldham's key-way 123 of the base member 121 fitting in and on the bearing-receiving portion 228c and the projection 128b, respectively. The direct seating of the back surface 120a of the base member 121 on the cavity surface 228a correctly positions the wrap 119 on the base member 121 in the axial or heightwise direction, while the Oldham's key-way 123 fitting on the projection 228b positions the base member 121 and, hence, the wrap 119 in the rotational direction.

When the vacuum injection compression molding machine is turned on, the mold is provisionally closed leaving a predetermined compression margin and a nozzle (not shown) of the molding machine is brought into contact with the sprue 231. Then, the aforementioned vacuum pump is started to decompress the mold cavity 229 down to a predetermined degree of vacuum. Subsequently, a predetermined amount of the aforementioned resin composition is poured through the sprue 231 and the gate 230a so as to fill the space 229a in the cavity 229. After the filling of the space 229a with the resin, the movable mold part 228 is further moved to compress the resin until the compression margin is reduced to zero. After the elapse of a predetermined time set for the curing of the resin, the movable mold part 228 is moved away from the stationary mold part 227 and the ejector rod 236 advances to separate the molded article from the cavity 229, whereby a resin-coated orbiting scroll member 105 having desired shape and size is obtained. The vacuum injection compression molding machine is then turned off.

EXAMPLE II

An orbiting scroll member 105 was produced by using the molding machine 200 which has been explained in connection with FIG. 14.

After placing a base member 121 of the scroll member in the cavity 229, the mold was provisionally closed leaving a compression margin of 1.5 mm. In this state, a gap of 2.0 mm was formed on the end of the wrap portion of the base member 121. The vacuum pump was then started to reduce the pressure in the cavity by 20 mmHg. After injecting the resin composition to fill the space 229a in the cavity 229, the mold was completely closed until the compression margin is reduced to zero. Then, the mold was opened after elapse of the curing time. In consequence, a resin coating layer 122 of a uniform thickness of 0.5 mm was formed on the surface of the base member 121 with a dimensional precision on the order of ±3 $\mu$m.

It will thus be seen that the method in accordance with the present invention makes it possible to produce a resin-coated orbiting scroll member with a high dimensional precision on the order of $\mu$m, while attaining various advantageous effects such as superior anti-oil and anti-freon characteristics, high bonding strength between the base member and the resin coating layer and high wear resistance of the scroll member as well as superior surface accuracy, mechanical strength and adhesive strength at the interface, thus ensuring a high reliability of operation of the orbiting scroll member and, hence, of the scroll-type fluid machine incorporating the orbiting scroll member.

Although the method of the invention has been described with respect to the fabrication of the orbiting scroll member, it will be clear to those skilled in the art that a similar production method can equally be applied to the production of the stationary scroll member. When the described method is applied to the production of the stationary scroll member, the base member 126 of this member is placed in the mold cavity such that the back of the base member 126 rests on the cavity surface of the movable mold part, thus positioning the wrap portion of the base member correctly in the heightwise direction. The positioning of the base member in the rotational direction can be effected by, for example, engaging a suitable portion, e.g., the discharge port, of the base member 126 with a corresponding projection formed on the cavity surface of the movable mold part.

FIG. 15 shows another example 200A of the molding machine used in the production of the orbiting scroll member 105 shown in FIG. 11. The molding machine 200A is shown in section together with the base member 121 of the orbiting scroll member placed therein. In this Figure, the same reference numerals are used to denote the same parts as those shown in FIG. 14.

More specifically, the mold 200A is composed of a stationary mold part 227A and a movable mold part 228A. The movable mold part 228A is provided with a vacuum suction port 238A which enables the mold cavity 229A to be evacuated from the periphery of the base member placed in the mold, and a gate 230A which enables the resin composition to be injected into the space on the outer periphery of the base member. Using this mold 200A, the orbiting scroll member 105 is produced by a method which is exactly the same as that explained before in connection with FIG. 14.

After the curing of the resin, the mold is opened and the ejector rod 236A advances to eject the molded article from the movable mold part 228A. Meanwhile, the portion g of the resin in the gate 230A is cut at its restricted portion so as to be left in the form a conical projection on the outer peripheral portion of the product. This resin portion g, however, is connected to the back of the base member of the orbiting scroll member 105, so that it can simply be cut and removed at its base end portion, without requiring any subsequent machining or finishing. Thus, the mold 200A shown in FIG. 15 appreciably improves the production efficiency.

FIG. 16 shows still another example 200B of the molding machine used in the production of the orbiting scroll member 105 shown in FIG. 11. In this Figure, the mold 200B is schematically shown in section and in closed state with the base member 121 of the scroll member placed in the mold cavity thereof. In this Figure, the same reference numerals are used to denote the same parts or members as those appearing in FIG. 14.

The mold 200B has a stationary mold part 227B and a movable mold part 228B. The movable mold part 228B is provided with a vacuum suction port 238A which enables the mold cavity 229 to be evacuated from the outer periphery of the base member 121 of the movable scroll member. On the other hand, the stationary mold part 227B is provided with a gate 230B communicating with the roof of the cavity 229 on the end of the wrap portion of the base member 121 of the orbiting scroll member. As shown in detail in FIG. 17, the gate 230B has a restricted portion c which is positioned closer to the wrap portion 119 of the base member 121 than the outermost portion 229b of a wrap-forming groove of the cavity 229.

Using this molding machine 200B, the orbiting scroll member can be produced by the same method as that explained before in connection with FIG. 14. When the mold is opened, the portion of the resin which has filled the gate 230B is cut at the restricted portion c. The cut end portion of the resin on the end of the wrap, however, does not affect the performance of the wrap, however, does not affect the performance of the compressor because it is recessed or inwardly offset from the end extremity of the wrap of the thus completed orbiting scroll member. Thus, there is no need for conducting any machining this portion of resin, so that the efficiency of the production of the orbiting scroll member is appreciably improved.

The molding apparatus explained in connection with FIG. 16 may be applied to the production of the scroll members shown in FIGS. 2, 3 and 7 having bulbous inner ends of the wraps. In such a case, the restricted portion c of the gate 230B is preferably located so as to the axially directed face the bulbous end portion of each wrap. With such an arrangement, the recess formed in the resin coating layer due to the presence of the restricted portion c is formed in the axially directed face of the bulbous portion of the resin-coated wrap, so that the influence of the recess on the strength of the resin coating layer is less than in the case where the restricted portion c is located at an other position.

The resin compound for forming the resin coating layers 5c and 122 in the described embodiments may be substituted by resin compositions which are composed mainly of polyimide resins. A typical example of such substitutive resin compositions contains 25 wt % of quartz glass as the inorganic filler, 25 wt % of mixture of molybdenum disulfide and graphite, and 50 wt % of a polyimide resin.

The polyimide resin exhibits a superior heat resistance when used at a temperature between 120° C. and 200° C. and shows a high strength of adhesion to the material of the base member 121 of the scroll member on the order of 100 kg/cm$^2$ or higher as well as distinguished anti-oil and anti-freon properties. The addition of the quartz glass lowers the linear thermal expansion coefficient of the resin composition to a level approximating that of the material of the base member 121 of the scroll member. The mixture of molybdenum disulfide and graphite provides a lubricating effect which improves the wear resistance. Within the temperature range between $-20°$ C. and 170° C. at which the compressor operates normally, the resin compound composed of these elements exhibits superior properties such as no substantial agelong change in the scroll wraps, good affinity or adhesive strength to the base member of the scroll member, high wear resistance, superior anti-oil and anti-freon properties, and high mechanical strength, thus remarkably improving the reliability of the resin coating layer 22. The resin compound provides a linear thermal expansion coefficient of $2.8 \times 10$ cm/cm/°C. and a glass transition temperature of 230° C.

EXAMPLE III

An orbiting scroll member 105 was formed by preparing a scroll base member 121 (see FIG. 11) which was an as-cast member cast from pig iron to have a surface roughness of 50 μmRmax, and then using the molding machine 200 shown in FIG. 14 to coat the surface of the base member 121 with a resin coating layer of a composition which contained 25 wt % of quartz glass, 25 wt % of the mixture of molybdenum disulfide and graphite powder, and 50 wt % of a polyimide resin. A stationary scroll member 125 (FIG. 13) was similarly made. The thickness of the resin coating layer on each scroll member was 0.5 mm and the dimensional precision of the scroll wrap covered by this resin composition was ±3 μm. The taper angle θ of the coated wraps was 2° both in the orbiting and stationary scroll members 105 and 125. The radius R, wrap height and scroll outside diameter were 1 mm, 30 mm and 130 mm, respectively, both in the orbiting scroll member 105 and the stationary scroll member 125. These scroll members 105 and 125 were assembled together and incorporated into a scroll compressor and an acceleration test was carried out with this compressor under compression ratio (suction/delivery ratio) of 1:6 (5 kg/cm$^2$G/30 kg/cm$^2$G) for 1000 hours at 3,600 r.p.m. No substantial reduction in the compression ratio was observed through the test, thus proving high reliability which is substantially equivalent to that exhibited by the precision-machined scroll members. After the test, the scroll compressor was disassembled and the resin coating layers 122 on the stationary and orbiting scroll members 105 and 125 were examined. The resin coating layers 122 showed neither damage nor denaturing at all.

What is claimed is:

1. A scroll type fluid compressor including a stationary composite scroll member and an orbiting composite scroll member, each of said composite scroll members having a substantially circular end wall and a generally spiral wrap formed on and extending axially from one side of said end wall, said scroll members being disposed such that their wraps are engaged with each other to cooperate together and with the end walls to define working chambers, and driving means for causing said orbiting scroll member to make an orbiting motion relative to said stationary scroll member so that said working chambers are moved radially to change volumes thereof, each of said scroll members including a metallic base scroll member having an end wall portion and a substantially spiral wrap portion extending axially from one side of said end wall portion and a coating layer of a resin composition formed on at least the entire surface of said side of said end wall portion, including surfaces of said wrap portion, wherein said spiral wrap of each of said composite scroll members terminates in an inner end portion which is generally bulbous as viewed axially of the scroll member, and wherein said resin composition includes a thermosetting resin and an inorganic filler and has a linear thermal expansion coefficient of not greater than $2.8 \times 10^{-5}$ cm/cm/°C. and a glass transition temperature of not lower than 160° C.

2. A scroll type fluid compressor according to claim 1, wherein the spiral wrap of each of said composite scroll members has its substantial section defined by outer and inner involute curves having inner ends, the inner end of said outer involute curve is angularly offset 180 degrees from the inner end of said inner involute curve, the inner end of said outer involute curve is smoothly connected to one end of a convexed arc, and the inner end of said inner involute curve is smoothly connected to one end of a concaved arc.

3. A scroll type fluid compressor according to claim 2, wherein said convexed and concaved curves are smoothly and directly connected together at their other ends.

4. A scroll type fluid compressor according to claim 2, wherein the other ends of said outer and inner involute curves are connected by a line tangential to both of said convexed and concaved arcs at their other ends.

5. A scroll type fluid compressor according to claim 2, wherein the coating layer in the wrap of each of said composite scroll members has a substantially uniform thickness over the entire spiral length of the wrap.

6. A scroll type fluid compressor according to claim 2, wherein the wrap portion of the base scroll member of each of said composite scroll members has a substantially uniform thickness over the entire spiral length of the wrap portion and the coating layer on the wrap portion of said base scroll member has a thickness which is greater in said bulbous inner end than in the other portions of the wrap.

7. A scroll type fluid compressor according to claim 1, wherein said thermosetting resin is bismaleimide-triazine resin.

8. A scroll type fluid compressor according to claim 1, wherein said thermosetting resin is polyamino bismaleimide-resin.

9. A scroll type fluid compressor according to claim 1, wherein said thermosetting resin is polyimide resin.

10. A scroll type fluid compressor according to claim 7, wherein said resin composition further includes a solid lubricant.

11. A scroll type fluid compressor according to claim 8, wherein said resin composition further includes a solid lubricant.

12. A scroll type fluid compressor according to claim 9, wherein said resin composition further includes a solid lubricant.

13. A scroll type fluid compressor according to claim 1, wherein said resin composition includes bismaleimide triazine resin and epoxy resin.

14. A scroll type fluid compressor according to claim 13, wherein said resin composition further includes a solid lubricant.

15. A scroll type fluid compressor according to claim 1, wherein said inorganic filler is molten silica.

16. A scroll type fluid compressor according to claim 10, wherein said solid lubricant comprises a mixture of graphite and molybdenum disulfide.

17. A scroll type fluid compressor according to claim 11, wherein said solid lubricant comprises a mixture of graphite and molybdenum disulfide.

18. A scroll type fluid compressor according to claim 12, wherein said solid lubricant comprises a mixture of graphite and molybdenum disulfide.

19. A scroll type fluid compressor according to claim 14, wherein said solid lubricant comprises a mixture of graphite and molybdenum disulfide.

* * * * *